United States Patent
Asami

(10) Patent No.: US 6,661,215 B2
(45) Date of Patent: Dec. 9, 2003

(54) SEMICONDUCTOR DEVICE WITH SMALL CURRENT CONSUMPTION HAVING STABLY OPERATING INTERNAL CIRCUITRY

(75) Inventor: Kazuo Asami, Hyogo (JP)

(73) Assignees: Mitsubishi Denki Kabushiki Kaisha, Tokyo (JP); Mitsubishi Electric System LSI Design Corporation, Itami (JP)

(*) Notice: Subject to any disclaimer, the term of this patent is extended or adjusted under 35 U.S.C. 154(b) by 0 days.

(21) Appl. No.: 10/135,380

(22) Filed: May 1, 2002

(65) Prior Publication Data

US 2003/0086278 A1 May 8, 2003

(30) Foreign Application Priority Data

Nov. 2, 2001 (JP) .......................... 2001-337624

(51) Int. Cl.⁷ .............................. G05F 1/40; G05F 3/16; H03K 17/687
(52) U.S. Cl. ...................... 323/281; 323/313; 327/437; 365/226
(58) Field of Search ................................ 323/313, 314, 323/315, 316, 312; 363/13, 14; 327/537, 541, 437, 108; 330/288, 253, 257; 365/226, 201

(56) References Cited

U.S. PATENT DOCUMENTS

| 5,077,518 A | * | 12/1991 | Han ........................... 323/181 |
| 5,124,632 A | * | 6/1992 | Greaves ....................... 323/316 |
| 5,235,520 A | | 8/1993 | Yokouchi |
| 5,260,644 A | | 11/1993 | Curtis |
| 5,349,559 A | * | 9/1994 | Park et al. .................... 365/226 |
| 5,434,533 A | * | 7/1995 | Furutani ....................... 327/538 |
| 6,542,027 B2 | * | 4/2003 | Zha et al. ..................... 327/540 |

FOREIGN PATENT DOCUMENTS

| DE | 41 13 931 C3 | 4/1992 |
| DE | 41 24 427 C2 | 12/1992 |
| DE | 695 22 150 T2 | 8/2001 |
| DE | 101 18 813 A1 | 10/2002 |
| JP | 59-109923 | 6/1984 |
| JP | 05-040535 | 2/1993 |
| JP | 06-119074 | 4/1994 |
| JP | 2001-134331 | 5/2001 |
| WO | WO 02/09029 | 1/2002 |

* cited by examiner

Primary Examiner—Rajnikant Patel
(74) Attorney, Agent, or Firm—Burns, Doane, Swecker & Mathis, LLP

(57) ABSTRACT

In a non-contact IC card, corresponding to increase/decrease of an operation current of an internal circuitry, absorbing current of an ICC fluctuation absorbing circuit is temporarily decreased/increased by the amount corresponding to the increase/decrease, and thereafter, the absorbing current is gradually increased/decreased to the initial value and an output current of a regulator is gradually increased/decreased. Therefore, abrupt change in output current of the regulator can be prevented, and an internal power supply potential can be stabilized.

11 Claims, 5 Drawing Sheets

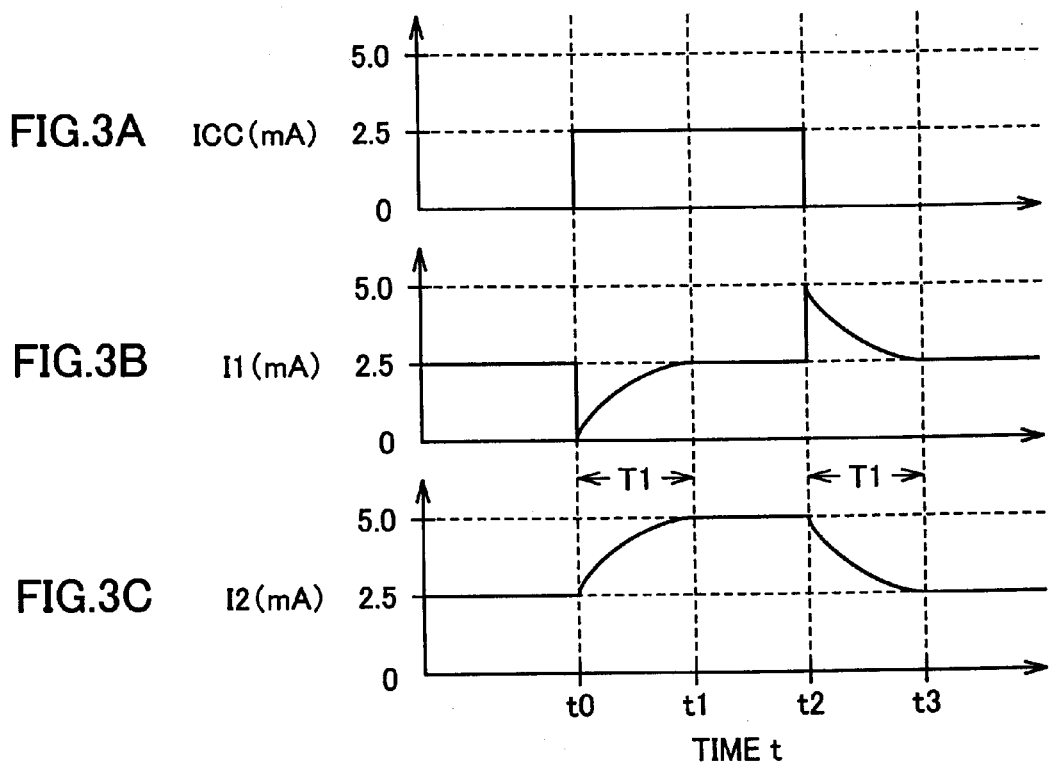
FIG. 3A ICC (mA)
FIG. 3B I1 (mA)
FIG. 3C I2 (mA)
TIME t
FIG. 4
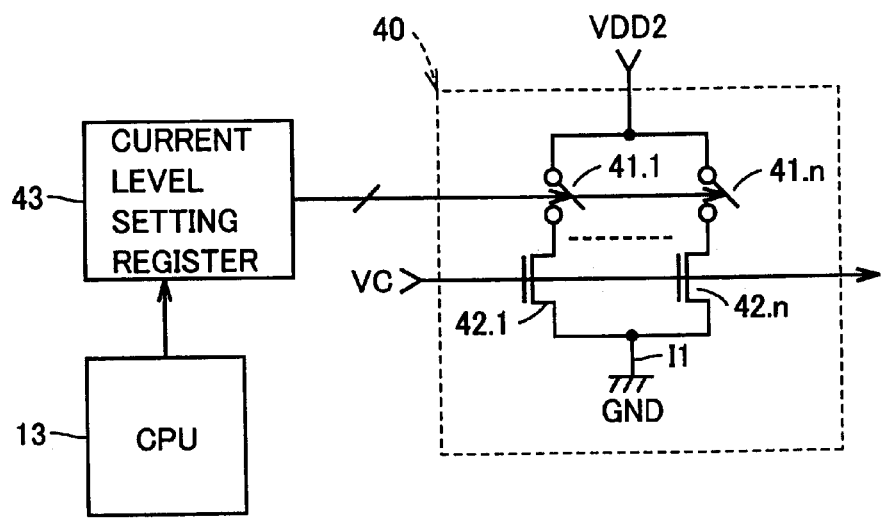

SEMICONDUCTOR DEVICE WITH SMALL CURRENT CONSUMPTION HAVING STABLY OPERATING INTERNAL CIRCUITRY

BACKGROUND OF THE INVENTION

1. Field of the Invention

The present invention relates to a semiconductor device and, more specifically, to a semiconductor device for an IC card.

2. Description of the Background Art

Conventionally, a non-contact IC card receiving power supply from a reader/writer and communicating data in a non-contact state has been known. In the non-contact IC card, a high frequency signal received by an antenna is rectified to generate a power supply voltage, and internal circuitry is driven by the power supply voltage.

The conventional non-contact IC card, however, has a problem that operation of the internal circuitry is destabilized as the power supply voltage fluctuates due to increase/decrease of operation current of the internal circuitry. In general, a capacitor charged by the power supply voltage is provided as a method of stabilizing the power supply voltage. It is difficult, however, to provide a capacitor of large capacitance in an IC chip for an IC card.

Accordingly, a method has been proposed in which a variable current source is connected parallel to the internal circuitry, and the current of the variable current source is decreased/increased in response to increase/decrease of the operation current of the internal circuitry so as to make constant the power supply current and to stabilize the power supply voltage. Such a method of stabilizing power supply voltage is disclosed, for example, in Japanese Patent Laying-Open No. 9-258836.

This method, however, has a problem that current consumption of the IC card increases, as it is necessary to keep the power supply current at the maximum value of the operation current of the internal circuitry.

Therefore, an object of the present invention is to provide a semiconductor device in which internal circuitry operates stably and which consumes less current.

SUMMARY OF THE INVENTION

The present invention provides a semiconductor device, including: an internal circuitry receiving a driving current from a power supply node and performing a prescribed operation; a current supplying circuit capable of controlling a supply current for supplying current to the power supply node; a current absorbing circuit capable of controlling an absorbing current for absorbing a current from the power supply node; and a control circuit for controlling each of the supply current of the current supplying circuit and the absorbing current of the current absorbing circuit so that the power supply node attains to a predetermined potential. The control circuit once decreases/increases and thereafter increases/decreases the absorbing current and increases/decreases the supply current, in response to increase/decrease of the driving current of the internal circuitry. Therefore, the potential at the power supply node can be stabilized and the operation of the internal circuitry can be stabilized. Further, only such an amount of current that corresponds to increase/decrease of the driving current is required to flow. Therefore, compared with the prior art in which a current equal to the maximum value of the driving current must be constantly kept flowing, current consumption can be reduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3A to 3C are time charts illustrating the method of stabilizing a second power supply potential of the non-contact IC card shown in FIGS. 1 and 2.

FIG. 4 is a circuit block diagram showing a main portion of the non-contact IC card in accordance with a second embodiment of the present invention.

DESCRIPTION OF THE PREFERRED EMBODIMENTS

First Embodiment

Figure 1:
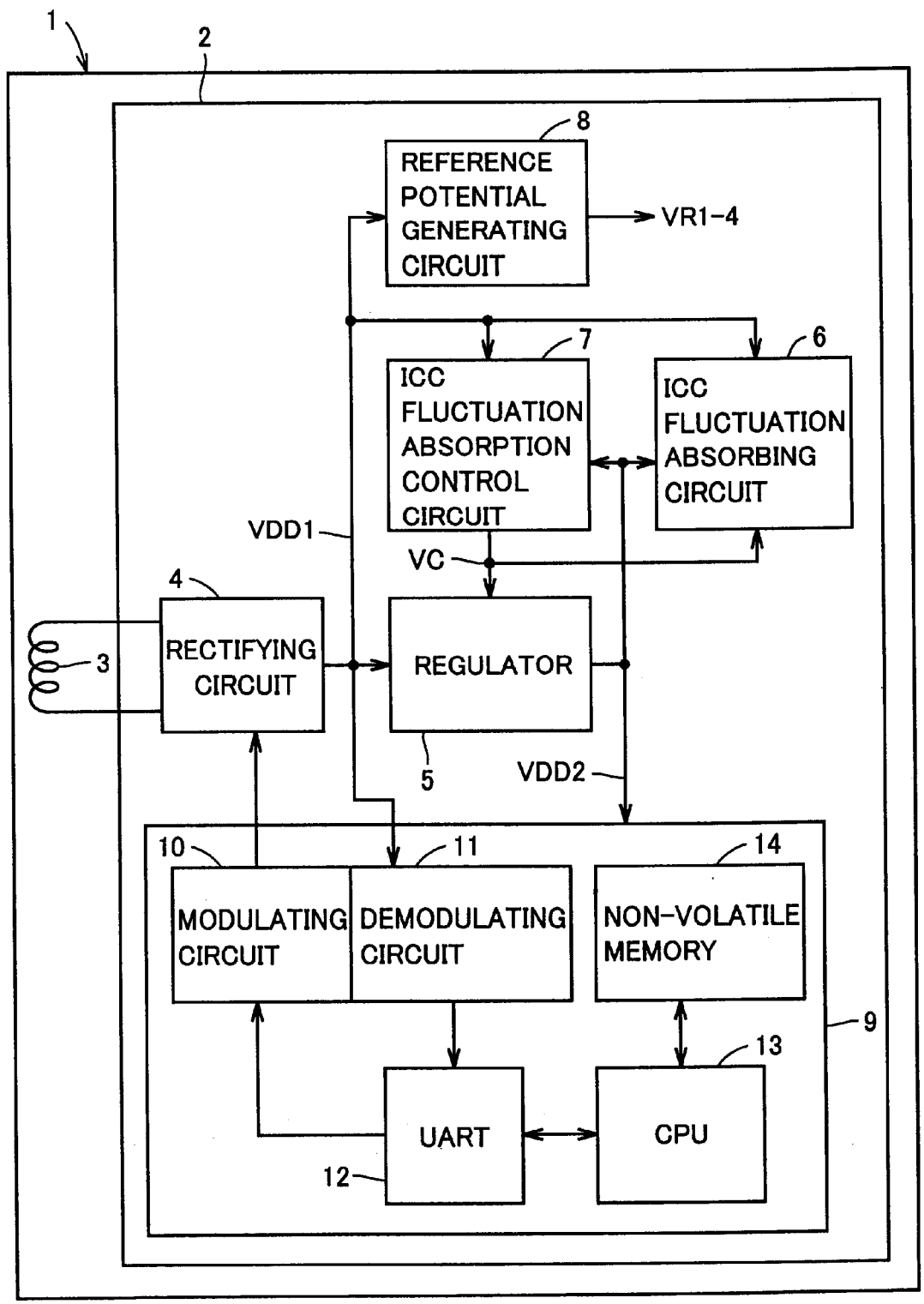
FIG. 1 is a circuit block diagram showing a configuration of a non-contact IC card in accordance with a first embodiment of the present invention.

FIG. 1 is a circuit block diagram representing a configuration of a non-contact IC card 1 in accordance with the first embodiment of the present invention. Referring to FIG. 1, non-contact IC card 1 includes an IC chip 2 and a transmission/reception antenna 3, and IC chip 2 includes a rectifying circuit 4, a regulator 5, an ICC fluctuation absorbing circuit 6, an ICC fluctuation absorption control circuit 7, a reference potential generating circuit 8 and an internal circuitry 9.

The transmission/reception antenna 3 is electromagnetically induction-coupled in a non-contact manner with the transmission/reception antenna of a reader/writer (not shown). Transmission/reception antenna 3 is connected to rectifying circuit 4 of IC chip 2. Rectifying circuit 4 rectifies a high frequency signal applied from the reader/writer through transmission/reception antenna 3 to generate a first power supply voltage VDD1 (for example, 5V), and applies the first power supply voltage VDD1 to regulator 5, ICC fluctuation absorbing circuit 6, ICC fluctuation absorption control circuit 7, reference potential generating circuit 8 and internal circuitry 9.

Regulator 5 generates a second power supply voltage VDD2 (for example, 2.5V) based on the first power supply voltage VDD1 from rectifying circuit 4 and on a control potential VC from ICC fluctuation absorption control circuit 7, and applies the second power supply voltage VDD2 to ICC fluctuation absorbing circuit 6, ICC fluctuation absorption control circuit 7 and internal circuitry 9. ICC fluctuation absorbing circuit 6 absorbs fluctuation of operation current ICC of internal circuitry 9 to stabilize the output voltage VDD2 from regulator 5. ICC fluctuation absorption control circuit 7 controls regulator 5 and ICC fluctuation absorbing circuit 6 so that the output voltage VDD2 of regulator 5 becomes constant. Reference potential generating circuit 8 generates various reference potentials VR1 to VR4 to be used in IC chip 2, based on the first power supply voltage VDD1 from rectifying circuit 4.

Internal circuitry 9 includes a modulating circuit 10, a demodulating circuit 11, an UART (Universal Asynchronous Receiver and Transmitter) 12, a CPU (Central Processing Unit) 13 and a non-volatile memory 14, and is driven by the output voltage VDD2 of regulator 5.

Modulating circuit 10 changes impedance of rectifying circuit 4 in accordance with serial digital signals from UART12. The reader/writer detects the change in impedance of rectifying circuit 4 through an antenna, and recovers the serial digital signals output from the UART12 based on the result of detection. Demodulating circuit 11 demodulates the high frequency signal rectified by rectifying circuit 4 to recover the serial digital signals transmitted from the reader/writer, and applies the serial digital signals to UART 12.

UART 12 converts the serial digital signals from demodulating circuit 11 to parallel digital signals and applies to CPU 13, and converts the parallel digital signals from CPU 13 to serial digital signals and applies to modulating circuit 10.

CPU 13 decodes a command included in the parallel digital signals from UART 12, and executes various processes based on the result of decoding. Non-volatile memory 14 is coupled to CPU 13 and stores digital signals.

When output of an ID code is instructed by the reader/writer, for example, CPU 13 reads the ID code from non-volatile memory 14 and applies it to UART 12. The ID code consisting of parallel digital signals is converted by UART 12 to serial digital signals and transmitted through modulating circuit 10, rectifying circuit 4 and antenna 3 to the reader/writer. When writing of information is instructed by the reader/writer, CPU 13 writes parallel digital signals (information) applied from the reader/writer through antenna 3, rectifying circuit 4, demodulating circuit 11 and UART 12 to non-volatile memory 14.

Figure 2:
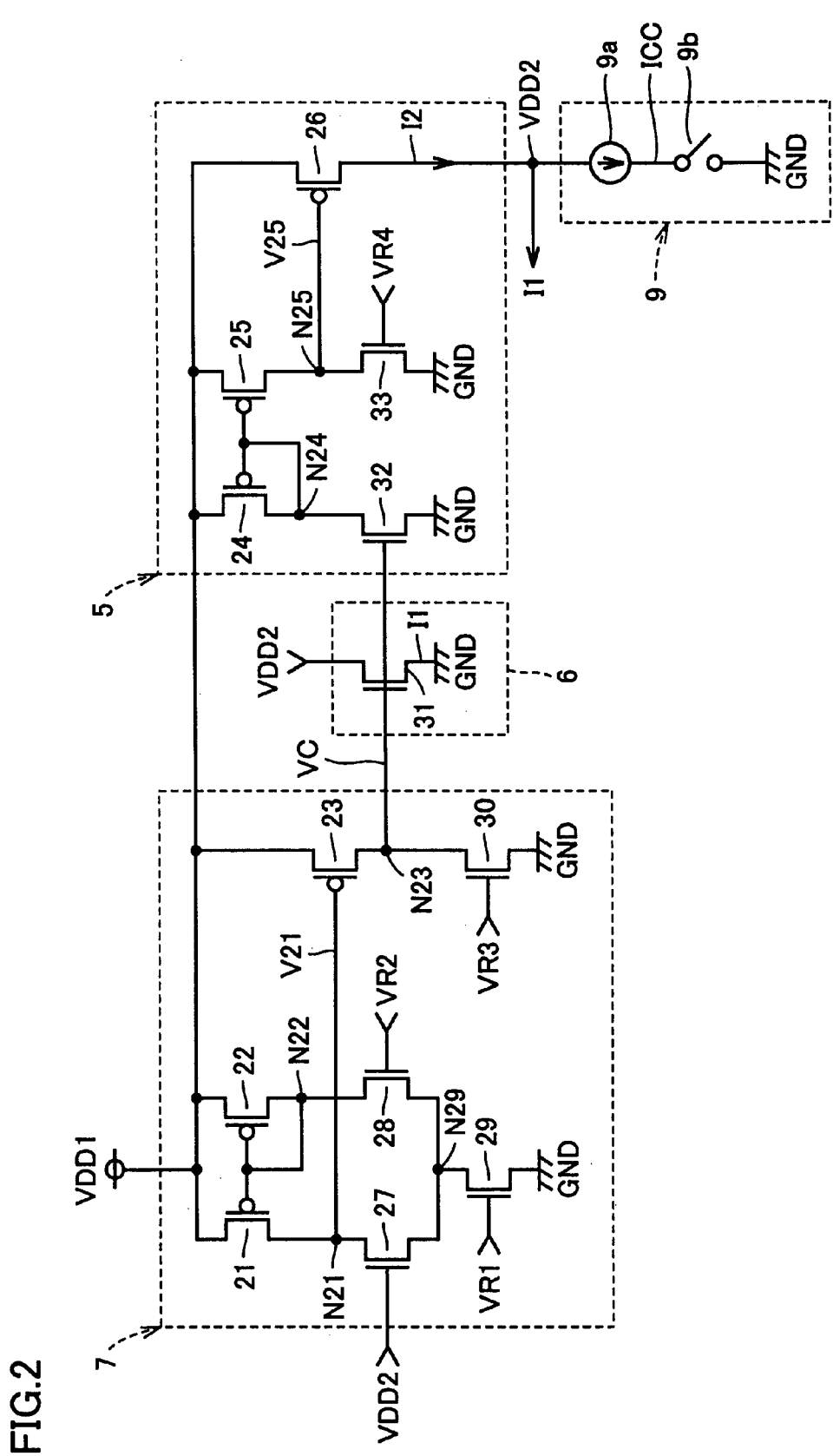
FIG. 2 is a circuit diagram showing the configuration of a regulator, an ICC fluctuation absorbing circuit and an ICC fluctuation absorption control circuit.

The method of stabilizing the second power supply voltage VDD2 characterizing the IC card 1 will be described in detail in the following. ICC fluctuation absorption control circuit 7 includes P channel MOS transistors 21 to 23 and N channel MOS transistors 27 to 30, as shown in FIG. 2. P channel MOS transistors 21 and 22 are connected between the line of the first power supply potential VDD1 and nodes N21 and N22, respectively, and have their gates both connected to node N22. P channel MOS transistors 21 and 22 constitute a current mirror circuit. N channel MOS transistors 27 and 28 are connected between nodes N21, N22 and node N29, respectively, and receive at their gates the second power supply potential VDD2 and reference potential VR2, respectively.

N channel MOS transistor 29 is connected between node N29 and the line of ground potential GND and receives at its gate a reference potential VR1. N channel MOS transistor 29 provides a constant current source. MOS transistors 21, 22 and 27 to 29 constitute a differential amplifier. The speed of response of the differential amplifier is set to a prescribed speed, in accordance with the value of the current flowing through N channel MOS transistor 29. P channel MOS transistor 23 is connected between the line of the first power supply potential VDD1 and output node N23, and receives at its gate the potential V21 of node N21. N channel MOS transistor 30 is connected between node N23 and the line of ground potential GND and receives at its gate the reference potential VR3. N channel MOS transistor 30 provides a constant current source. The potential of node N23 will be a control potential VC.

The current flowing through N channel MOS transistor 29 is branched to MOS transistors 21, 27 and MOS transistors 22, 28. A current of the value corresponding to the reference potential VR2 flows through N channel MOS transistor 28. N channel MOS transistor 28 and P channel MOS transistor 22 are connected in series and P channel MOS transistors 22 and 21 form a current mirror circuit. Therefore, a current of the same value flows through MOS transistors 21, 22 and 28. A current of the value corresponding to the second power supply potential VDD2 flows through N channel MOS transistor 27. When the second power supply potential VDD2 is of the same level as reference potential VR2, the current flowing through MOS transistors 21, 22 and 28 becomes equal to the current flowing through N channel MOS transistor 27, so that the potential V21 of node N21 matches the potential of node N22. Here, the size of MOS transistors 23 and 30 is set such that a current of a prescribed level flows through P channel MOS transistor 23 so that the output potential VC of ICC fluctuation absorption control circuit 7 attains to the reference potential VR4.

When the second power supply potential VDD2 becomes higher than the reference potential VR2, the current flowing through N channel MOS transistor 27 becomes larger than the current flowing through MOS transistors 21, 22 and 28, so that the potential V21 at node N21 lowers, the current flowing through P channel MOS transistor 23 increases and the control potential VC increases. When the second power supply potential VDD2 becomes lower than the reference potential VR2, the current flowing through N channel MOS transistor 27 becomes smaller than the current flowing through MOS transistors 21, 22 and 28, so that the potential V21 of node N21 increases, the current flowing through P channel MOS transistor 23 becomes smaller, and the control potential VC lowers.

ICC fluctuation absorbing circuit 6 includes an N channel MOS transistor 31. N channel MOS transistor 31 is connected between the line of the second power supply potential VDD2 and the line of the ground potential GND, and receives at its gate the control potential VC. A current I1 of the level corresponding to control potential VC flows through N channel MOS transistor 31. When the control potential VC is equal to the reference potential VR4, the current I1 attains to a predetermined value (for example, 2.5 mA). When control potential VC increases, the current I1 increases and the second power supply potential VDD2 decreases. When the control potential VC decreases, the current I1 becomes smaller, and the second power supply voltage VDD2 increases.

Regulator 5 includes P channel MOS transistors 24 to 26 and N channel MOS transistors 32 and 33. P channel MOS transistors 24 and 25 are connected between the line of the first power supply potential VDD1 and nodes N24 and N25, respectively, and having their gates both connected to node N24. P channel MOS transistors 24 and 25 constitute a current mirror circuit. N channel MOS transistors 32 and 33 are connected between the line of the ground potential GND and nodes N24 and N25, respectively, and receive at their gates the control potential VC and the reference potential VR4, respectively. MOS transistors 24, 25, 32 and 33 constitute a differential amplifier. P channel MOS transistor 26 is connected between the line of the first power supply potential VDD1 and the line of the second power supply potential VDD2, and receives at its gate the potential V25 of node N25.

N channel MOS transistor 32 and P channel MOS transistor 24 are connected in series and P channel MOS transistors 24 and 25 constitute a current mirror circuit. Therefore, a current of the same value flows through MOS transistors 24, 25 and 32. A current of the value corresponding to the reference potential VR4 flows through N channel MOS transistor 33. When the control potential VC and the reference potential VR4 are of the same level, the current flowing through MOS transistors 24, 25 and 32 becomes equal to the current flowing through N channel MOS transistor 33, so that the potential of node N24 matches the potential V25 of node N25.

When the control potential VC becomes higher than the reference potential VR4, the current flowing through N channel MOS transistor 33 becomes smaller than the current flowing through MOS transistors 24, 25 and 32, so that the potential V25 of node N25 increases, the current I2 flowing through P channel MOS transistor 26 becomes smaller and the second power supply potential VDD2 lowers. When the control potential VC becomes lower than the reference potential VR4, the current flowing through N channel MOS transistor 33 becomes larger than the current flowing through MOS transistors 24, 25 and 32, so that the potential V25 of node N25 lowers, the current I2 flowing through P channel MOS transistor 26 increases and the second power supply potential VDD2 increases.

The equivalent circuit of internal circuitry 9 includes a current source 9a and a switch 9b connected in series between the line of the second power supply potential VDD2 and the line of the ground potential GND. When the internal circuitry 9 is inoperative, switch 9b is rendered non-conductive, so that operation current ICC attains 0 mA. When the internal circuitry 9 is in operation, switch 9b is rendered conductive, and operation current ICC attains to a current in accordance with the state of operation of the internal circuitry 9 (for example, 2.5 mA).

FIGS. 3A to 3C are time charts representing the operation of portions related to stabilization of the second power supply potential VDD2 shown in FIG. 2. Referring to FIGS. 3A to 3C, it is assumed that in the initial state, internal circuitry 9 is not in operation and the operation current ICC of internal circuitry 9 is 0 mA. At this time, the output current I2 of regulator 5 and absorbing current I1 of fluctuation absorbing circuit 6 are both 2.5 mA.

When switch 9b of internal circuitry 9 is rendered conductive at a certain time point t0, the output current I2 of regulator 5 turns from fluctuation absorbing circuit 6 to internal circuitry 9, as the resistance value of current source 9a of internal circuitry 9 is sufficiently lower than the resistance value of N channel MOS transistor 31, so that the absorbing current I1 of ICC fluctuation absorbing circuit 6 attains to 0 mA and operation current ICC of internal circuitry 9 attains to 2.5 mA.

At this time, the level of the second power supply potential VDD2 decreases to be lower than the reference potential VR2, the potential V21 of node N21 gradually increases, control potential VC gradually decreases, and resistance values of N channel MOS transistors 31 and 32 gradually increase. When the resistance value of N channel MOS transistor 32 increases, the current flowing through N channel MOS transistors 24, 25 and 32 decreases, and the potential V25 of node N25 lowers. When the potential V25 of node N25 decreases, the current I2 of P channel MOS transistor 26 increases. The increase of current I2 corresponds to the increase in absorbing current I1 of ICC fluctuation absorbing circuit 6.

When the current I2 increases, the second power supply potential VDD2 increases, the second power supply potential VDD2 becomes equal to the reference potential VR2 after a prescribed time period T1 from time t0 (time t1), the control potential VC becomes equal to the reference potential VR4, and the absorbing current I1 of the ICC fluctuation absorbing circuit 6 returns to the initial value (2.5 mA). At this time, the output current I2 of regulator 5 has reached I1+ICC=2.5+2.5=5.0 mA. The prescribed time period T1 is set to be sufficiently longer than the time necessary for the absorbing current I1 to change from 2.5 mA to 0 .mA.

Thereafter, at time t2, when the switch 9b of internal circuitry 9 is rendered non-conductive, the current ICC that has been flowing through internal circuitry 9 turns to ICC fluctuation absorbing circuit 6, so that operation current ICC of internal circuitry 9 attains to 0 mA and the absorbing current I1 of ICC fluctuation absorbing circuit 6 attains to 5.0 mA.

Further, at this time, the level of the second power supply potential VDD2 increases to be higher than the reference potential VR2, the potential V21 of node N21 gradually lowers and control potential VC increases, and resistance values of N channel MOS transistors 31 and 32 gradually decrease. When the resistance value of N channel MOS transistor 32 decreases, the current flowing through N channel MOS transistors 24, 25 and 32 increases and the potential at node N25 increases. When the potential at node N25 increases, the current I2 of P channel MOS transistor 26 decreases. The decrease of the current I2 corresponds to the decrease of absorbing current I1 of ICC fluctuation absorbing circuit 6. When the current I2 decreases, the second power supply potential VDD2 decreases, and after the lapse of a prescribed time period T1 from time point t2 (time point t3), the second power supply potential VDD2 becomes equal to the reference potential VR2, the control potential VC becomes equal to the reference potential VR4 and the absorbing current I1 of ICC fluctuation absorbing circuit 6 returns to the initial value (2.5 mA). At this time, the output current I2 of regulator 5 is I1+ICC=2.5 +0=2.5 mA. Here, the prescribed time period T1 is set to be sufficiently longer than the time required for absorbing current I1 to change from 2.5 mA to 5.0 mA at time point t2.

When the operation current ICC of internal circuitry 9 increases from 2.5 mA to 5.0 mA at time t1, for example, the absorbing current I1 of ICC fluctuation absorbing circuit 6 again obtains to 0 mA and the output current I2 of regulator 5 gradually increases. The rate of change in output current I2 of regulator 5 is suppressed to such an extent that the power supply potentials VDD1 and VDD2 are not changed by the change in current I2.

In the first embodiment, corresponding to the increase/decrease of the operation current of internal circuitry 9, the absorbing current I1 of ICC fluctuation absorbing circuit 6 is decreased/increased by the amount corresponding to the increase/decrease, and thereafter, the output current I2 of regulator 5 is gradually increased/decreased to return the absorbing current I1 of ICC fluctuation absorbing circuit 6 to the initial set value. Therefore, abrupt change in output current I2 of regulator 5 can be prevented. Therefore, the second power supply potential VDD2 can be stabilized, enabling stable operation of the internal circuitry 9.

Further, as the current I1 flowing through ICC fluctuation absorbing circuit 6 is set to a minimum necessary constant value (2.5 mA), current consumption of the IC card can be reduced as compared with the prior art in which the output current of the regulator is fixed at the maximum value of current consumption of the internal circuitry and the current consumption of the ICC fluctuation absorbing circuit is decreased/increased corresponding to the amount of increase/decrease of the current consumption of the internal circuitry.

Further, as the change in current consumption is adapted not to the rectified voltage VDD1, there is no malfunction in communication when demodulation is performed using the rectified voltage VDD1.

Second Embodiment

FIG. 4 is a circuit block diagram representing a main portion of the non-contact IC card in accordance with the second embodiment of the present invention. Referring to FIG. 4, the non-contact IC card is different from the non-contact IC card 1 shown in FIGS. 1 to 3 in that the ICC fluctuation absorbing circuit 6 is replaced by fluctuation absorbing circuit 40, and that a current level setting register 43 is additionally provided.

ICC fluctuation absorbing circuit 40 includes n (where n is an integer not smaller than 2) switches 41.1 to 41.n and n N channel MOS transistors 42.1 to 42.n. N channel MOS transistors 42.1 to 42.n have mutually different sizes. Switches 41.1 to 41.n each have one terminal connected to the line of the second power supply potential VDD2. N channel MOS transistors 42.1 to 42.n are connected between the other terminal of switches 41.1 to 41.n and the line of the ground potential GND, respectively, and receive, at their gates, the control potential VC. Switches 41.1 to 41.n are controlled by an output signal of current level setting register 43.

Current level setting register 43 holds a select signal applied from CPU 13 and in accordance with the select signal, renders conductive any one of switches 41.1 to 41.n. As N channel MOS transistors 42.1 to 42.n have mutually different sizes, initial value of absorbing current I1 of ICC fluctuation absorbing circuit 40 can be changed by selecting which of the switches is rendered conductive. When switch 42.1 is rendered conductive, for example, the current I1 will be 2.5 mA, when switch 42.2 is rendered conductive, I1=5.0 mA, and when switch 42.3 is rendered conductive, I1=7.5 mA. Other configuration and operation are the same as those of non-contact IC card 1 in accordance with the first embodiment, and therefore, description thereof will not be repeated.

In the second embodiment, as the initial value of the absorbing current I1 of ICC fluctuation absorbing circuit 40 can be set to a desired value, it is possible to optimally set the initial value of the absorbing current IC of ICC fluctuation absorbing circuit 40 in accordance with the use of the IC card, even when the operation current ICC changes dependent on the use of the card.

Though only one of n switches 41.1 to 41.n is rendered conductive in the second embodiment, two or more switches may be rendered conductive at one time. By doing so, it becomes possible to change the initial value of the absorbing current I1 in a larger number of stages. Further, N channel MOS transistors 42.1 to 42.n may be adapted to have the same size and two or more switches may be rendered conductive at one time.

Third Embodiment

Figure 5:
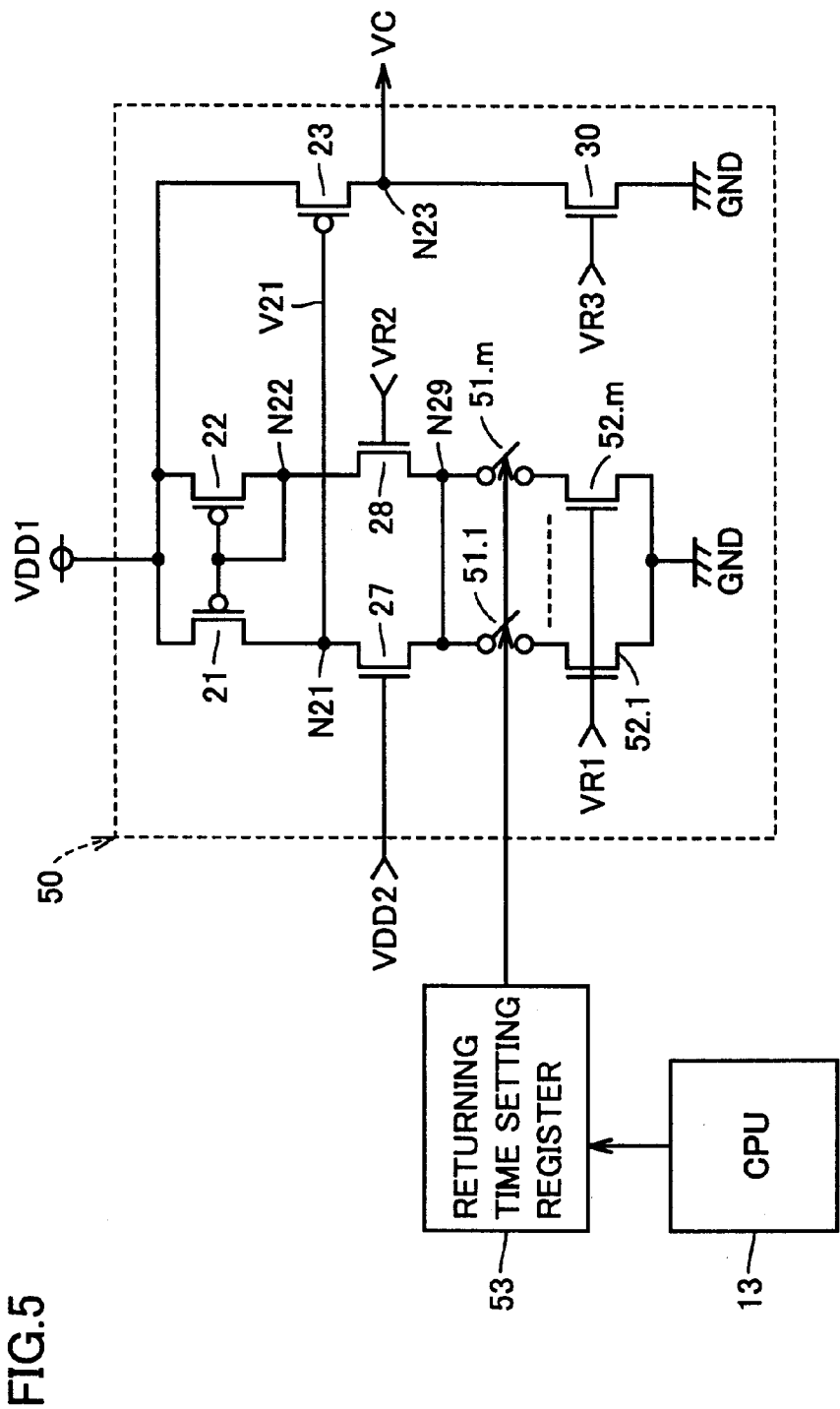
FIG. 5 is a circuit block diagram showing a main portion of a non-contact IC card in accordance with a third embodiment of the present invention.

FIG. 5 is a circuit block diagram representing a main portion of the non-contact IC card in accordance with the third embodiment of the present invention. Referring to FIG. 5, the non-contact IC card is different from the non-contact IC card 1 shown in FIGS. 1 to 3 in that the ICC fluctuation absorption control circuit 7 is replaced by an ICC fluctuation absorption control circuit 50, and that a return time setting register 53 is additionally provided.

ICC fluctuation absorption control circuit 50 is formed by replacing N channel MOS transistor 29 of ICC fluctuation absorbing circuit 6 by m (where m is an integer not smaller than 2) switches 51.1 to 51.m and m N channel MOS transistors 52.1 to 52.m. N channel MOS transistors 52.1 to 52.m have mutually different sizes. Switches 51.1 to 51.m each have one terminal connected to node N29. N channel MOS transistors 52.1 to 52.m are connected between the other terminal of switches 51.1 to 51.m and the line of the ground potential GND respectively, and receive at their gates the reference potential VR1. Switches 51.1 to 51.m are controlled by an output signal of returning time setting register 53.

Returning time setting register 53 holds a select signal applied from CPU 13 and, in accordance with the select signal, renders conductive any of the switches 51.1 to 51.m. As N channel MOS transistors 52.1 to 52.m have mutually different sizes, it is possible to change the speed of response of the differential amplifier including MOS transistors 21, 22, 27 and 28 in accordance with which of the switches is selected. When the speed of response of the differential amplifier is changed, the speed of change of V21, VC, I1, V25 and I2 can be changed, and hence the returning time T1 shown in FIG. 3 can be changed. For example, the returning time T1 becomes the shortest when the switch 51.1 is rendered conductive, and the longest when the switch 51.m is rendered conductive.

In the third embodiment, the returning time T1 of currents I1 and I2 can be set to a desired time period. Therefore, the speed of change of currents I1 and I2 can be set to the highest speed at which power supply potentials VDD1 and VDD2 are not affected by the increase/decrease of I1 and I2, and hence the operation of the non-contact IC card can be made stable and the reliability can be improved.

Though only one of m switches 51.1 to 51.m is rendered conductive in the third embodiment, two or more switches may be rendered conductive at one time. In that case, the returning time T1 of I1 and I2 can be changed in a larger number of stages. Further, N channel MOS transistors 52.1 to 52.m may be adapted to have the same size and two or more switches may be rendered conductive at one time.

Further, the second and third embodiments may be combined so that the initial value of the absorbing current I1 of ICC fluctuation absorbing circuit 40 can be changed and the returning time T1 of I1 and I2 can be changed.

Fourth Embodiment

Figure 6:
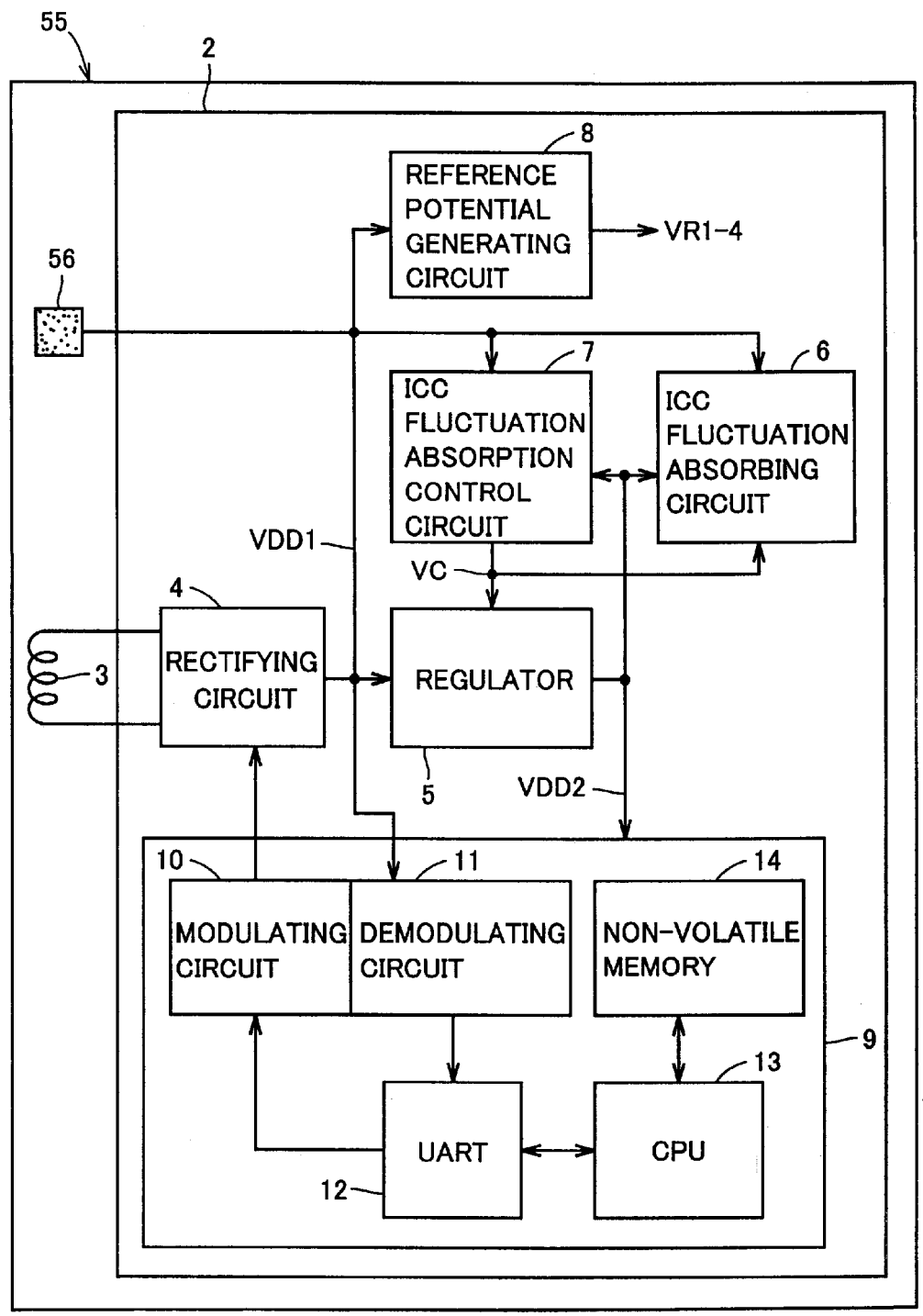
FIG. 6 is a circuit block diagram representing a configuration of a combi card in accordance with a fourth embodiment of the present invention.

FIG. 6 is a circuit block diagram representing a configuration of a combi card in accordance with the fourth embodiment of the present invention. Referring to FIG. 6, the combi card 55 has an external power supply terminal 56 additionally provided to the non-contact IC card 1 shown in FIG. 1. External power supply terminal 56 is connected to the line of the first power supply potential VDD1. Combi card 55 is usable both for a contact type reader/writer and a non-contact type reader/writer. For the non-contact type reader/writer, combi card 55 operates in the similar manner as non-contact IC card 1. When set in a contact type reader/writer, the first power supply potential VDD of combi card 55 is applied not from the rectifying circuit 4 but from the reader/writer, through external power supply terminal 56.

In such a combi card, it is possible to analyze coding decoding operations of CPU 13 by analyzing the change in a small current flowing into the external power supply terminal 56 (for example, it is possible to read a key of a person). In the combi card, however, I1 and I2 fluctuate when CPU 13 operates, and therefore, it becomes difficult to analyze the change in current caused by the operation of the CPU 13, and hence, tamper resistance can be improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor device, comprising:
an internal circuitry receiving a driving current from a power supply node and performing a prescribed operation;
a current supplying circuit capable of controlling a supply current for supplying current to said power supply node;
a current absorbing circuit capable of controlling an absorbing current for absorbing a current from said power supply node; and
a control circuit for controlling each of the supply current of said current supplying circuit and the absorbing current of said current absorbing circuit so that said power supply node attains to a predetermined potential; wherein
said control circuit once decreases/increases and thereafter increases/decreases said absorbing current and increases/decreases said supply current, in response to increase/decrease of the driving current of said internal circuitry.

2. The semiconductor device according to claim 1, wherein
said control circuit once decreases/increases said absorbing current from a predetermined value and thereafter returns said absorbing current to said predetermined value; and
said predetermined value is changeable;
said semiconductor device further comprising
a first setting circuit for setting said predetermined value to a desired value.

3. The semiconductor device according to claim 1, wherein
the rate of increasing/decreasing said supply current and said absorbing current in accordance with increase/decrease of said driving current is changeable;
said semiconductor device further comprising
a second setting circuit for setting the rate of increasing/decreasing said supply current and said absorbing current in accordance with increase/decrease of said driving current to a desired rate.

4. The semiconductor device according to claim 1, wherein
said control circuit increases/decreases, in accordance with increase/decrease of the driving current of said internal circuitry, said supply current by the amount of increase/decrease of said driving current, temporarily changes value of said absorbing current from a predetermined value to a different value and thereafter returns the current to said predetermined value.

5. The semiconductor device according to claim 4, wherein
said control circuit controls said supply current and said absorbing current such that time for said absorbing current to return from said different value to said predetermined value is longer than time for said absorbing current to change from said predetermined value to said different value.

6. The semiconductor device according to claim 1, wherein
said control circuit compares a potential at said power supply node with a first reference potential and generates a control potential of which level corresponds to the result of comparison;
said current absorbing circuit includes a transistor connected between said power supply node and a node of a ground potential and causes a current of which level corresponds to said control potential; and
said current supplying circuit adjusts the value of said supply current in accordance with said control potential.

7. The semiconductor device according to claim 6, wherein
said control circuit temporarily decreases/increases said absorbing current in response to increase/decrease of said driving current and thereafter returns the absorbing current to said predetermined value;
said semiconductor device further comprising
a first register capable of changing a holding signal holding a first setting signal for setting said predetermined value; wherein
said current absorbing circuit includes a plurality of transistors each receiving at an input electrode said control potential, and a first switching circuit selecting at least one of said plurality of transistors in accordance with the first setting signal held by said first register and connecting each said selected transistor between said power supply node and said node of the ground potential.

8. The semiconductor device according to claim 6, further comprising
a second register capable of changing a holding signal holding a second setting signal for setting the rate of increase/decrease of said supply current and said absorbing current; wherein
said control circuit includes
a pair of differential transistors receiving at their input electrodes the potential at said power supply node and said first reference potential, respectively, and each having one electrode commonly connected,
a plurality of resistance elements, and
a second switching circuit selecting at least one of said plurality of resistance elements in accordance with the second setting signal held by said second register and connecting each selected resistance element to one electrode of said pair of differential transistors and a node of a second reference potential.

9. The semiconductor device according to claim 1, further comprising
a rectifying circuit rectifying an AC current to generate a power supply current, and applying the power supply current to said current supplying circuit.

10. The semiconductor device according to claim 9, wherein
said semiconductor device is provided in an IC card together with an antenna, and
said rectifying circuit rectifies an AC signal received by said antenna.

11. The semiconductor device according to claim 10, wherein
said IC card further includes an external power supply terminal for externally supplying a power supply current to said current supply circuit.

* * * * *

UNITED STATES PATENT AND TRADEMARK OFFICE
CERTIFICATE OF CORRECTION

PATENT NO. : 6,661,215 B2
DATED : December 9, 2003
INVENTOR(S) : Kazuo Asami

It is certified that error appears in the above-identified patent and that said Letters Patent is hereby corrected as shown below:

Title page,
Item [56], References Cited, FOREIGN PATENT DOCUMENTS, add the following:
-- JP    9-258836      10/03/97
   JP    10-240889     9/11/98 --.

Signed and Sealed this

Twenty-fourth Day of January, 2006

JON W. DUDAS
*Director of the United States Patent and Trademark Office*